United States Patent
Burton et al.

(10) Patent No.: US 12,192,409 B2
(45) Date of Patent: Jan. 7, 2025

(54) CATEGORIZING AUDIO CALLS BASED ON MACHINE LEARNING MODELS

(71) Applicant: SAP SE, Walldorf (DE)

(72) Inventors: Anh Burton, Seattle, WA (US); Hans-Martin Will, Marina del Rey, CA (US); James Tian, Redondo Beach, CA (US); Andreas Kurt Pursche, Santa Ana, CA (US); Jeff Dixon, Yorktown, VA (US); Matthew Berg, Minneapolis, MN (US); Thomas Obermeyer, Alsbach (DE)

(73) Assignee: SAP SE, Walldorf (DE)

( * ) Notice: Subject to any disclaimer, the term of this patent is extended or adjusted under 35 U.S.C. 154(b) by 873 days.

(21) Appl. No.: 16/903,082

(22) Filed: Jun. 16, 2020

(65) Prior Publication Data

US 2021/0266407 A1    Aug. 26, 2021

Related U.S. Application Data (60) Provisional application No. 62/980,030, filed on Feb. 21, 2020.

(51) Int. Cl.
| | |
|---|---|
| *H04M 3/00* | (2024.01) |
| *G06N 20/00* | (2019.01) |
| *G06Q 30/016* | (2023.01) |
| *G10L 15/26* | (2006.01) |
| *H04M 3/523* | (2006.01) |

(52) U.S. Cl.
CPC .......... *H04M 3/5235* (2013.01); *G06N 20/00* (2019.01); *G06Q 30/016* (2013.01); *G10L 15/26* (2013.01)

(58) Field of Classification Search
CPC ... H04M 3/5235; G06N 20/00; G06Q 30/016; G10L 15/26
See application file for complete search history.

(56) References Cited

U.S. PATENT DOCUMENTS

| | | | | |
|---|---|---|---|---|
| 9,774,591 | B2* | 9/2017 | Paya | H04L 9/0897 |
| 10,769,204 | B2* | 9/2020 | Vergin | G06F 16/683 |
| 2008/0125067 | A1* | 5/2008 | Bells | H04W 40/02 |
| | | | | 455/414.1 |
| 2012/0023145 | A1* | 1/2012 | Brannon | G06F 16/122 |
| | | | | 707/822 |
| 2020/0250608 | A1* | 8/2020 | Sharma | G06F 16/9038 |
| 2020/0402541 | A1* | 12/2020 | Talbot | G06V 10/82 |
| 2022/0114281 | A1* | 4/2022 | Llamas Virgen | G06N 20/00 |

* cited by examiner

*Primary Examiner* — Rasha S Al Aubaidi
(74) *Attorney, Agent, or Firm* — Fountainhead Law Group, PC (57) ABSTRACT

Some embodiments provide a non-transitory machine-readable medium that stores a program. The program receives a set of audio files. Each audio file in the set of audio files includes audio from an audio call. The program further truncates each audio file in the set of audio files to a defined call length. For each audio call in the set of audio calls, the program also receives a transcript of the audio call based on the audio file of the audio call. For each audio call in the set of audio calls, the program further uses the transcript of the audio call as input to a machine learning model for the machine learning model to predict a category from a plurality of categories that is associated with the audio call.

20 Claims, 7 Drawing Sheets

CATEGORIZING AUDIO CALLS BASED ON MACHINE LEARNING MODELS

CROSS-REFERENCE TO RELATED APPLICATION

The present application claims the benefit and priority of U.S. Provisional Application No. 62/980,030, filed Feb. 21, 2020, entitled "Extraction of Insights from Support Conversations Based on Natural Language Understanding and Artificial Intelligence," the entire contents of which are incorporated herein by reference in its entirety for all purposes.

BACKGROUND

With the advent of the computing age and the growth of information technology, many different aspects of everyday life have become digitized. For example, documents may be created electronically and saved as files on a computing system. These documents as well as written communications can be transmitted to others electronically via email, text message, etc. Audio calls between people can be made electronically, saved, and later retrieved. Collectively, this digitized data can contain a lot of hidden information. Some technologies such as data analytics and big data may be used to extract this information among other insights from the digitized data.

SUMMARY

In some embodiments, non-transitory machine-readable medium stores a program executable by at least one processing unit of a device. The program receives a set of audio files. Each audio file in the set of audio files includes audio from an audio call. The program further truncates each audio file in the set of audio files to a defined call length. For each audio call in the set of audio calls, the program also receives a transcript of the audio call based on the audio file of the audio call. For each audio call in the set of audio calls, the program further uses the transcript of the audio call as input to a machine learning model for the machine learning model to predict a category from a plurality of categories that is associated with the audio call.

In some embodiments, the program may further, for each audio file in the set of audio files, send the audio file to a third-party transcription service; and, for each audio file in the set of audio files, receive from the transcript of the audio file from the third-party transcription service. The third-party transcription service may generate the transcript by converting the audio file to text using a speech-to-text algorithm.

In some embodiments, the program may further receive a list of the set of audio calls from a third-party system configured to manage audio calls received at customer support centers and send the third-party system a request for metadata associated with the set of audio calls. The metadata may include locations of the set of audio files of the audio calls. The program may also retrieve the set of audio files of the set of audio calls from the locations. Receiving the set of audio files may include retrieving the set of audio files. The program may further store the set of metadata associated with the set of audio calls and the categories associated with the set of audio calls in a storage. The set of transcripts of the set of audio calls and the categories associated with the set of transcripts of the set of audio calls stored in the storage may be used by a cloud computing system to generate visualizations for a client device.

In some embodiments, each audio file in the set of audio files may include a recording of a customer support session. Each category in the several categories may represent a closure classification for a particular customer support session. The machine learning model may be a transformer-based model.

In some embodiments, a method receives a set of audio files. Each audio file in the set of audio files includes audio from an audio call. The method further truncates each audio file in the set of audio files to a defined call length. For each audio call in the set of audio calls, the method also receives a transcript of the audio call based on the audio file of the audio call. For each audio call in the set of audio calls, the method further uses the transcript of the audio call as input to a machine learning model for the machine learning model to predict a category from a plurality of categories that is associated with the audio call.

In some embodiments, the method may further, for each audio file in the set of audio files, send the audio file to a third-party transcription service; and, for each audio file in the set of audio files, receive from the transcript of the audio file from the third-party transcription service. The third-party transcription service may generate the transcript by converting the audio file to text using a speech-to-text algorithm.

In some embodiments, the method may further receive a list of the set of audio calls from a third-party system configured to manage audio calls received at customer support centers and send the third-party system a request for metadata associated with the set of audio calls. The metadata may include locations of the set of audio files of the audio calls. The method may also retrieve the set of audio files of the set of audio calls from the locations. Receiving the set of audio files may include retrieving the set of audio files. The method may further store the set of metadata associated with the set of audio calls and the categories associated with the set of audio calls in a storage. The set of transcripts of the set of audio calls and the categories associated with the set of transcripts of the set of audio calls stored in the storage may be used by a cloud computing system to generate visualizations for a client device.

In some embodiments, each audio file in the set of audio files may include a recording of a customer support session. Each category in the several categories may represent a closure classification for a particular customer support session. The machine learning model may be a transformer-based model.

In some embodiments, a system includes a set of processing units and a non-transitory machine-readable medium that stores instructions. The instructions cause at least one processing unit to receive a set of audio files. Each audio file in the set of audio files includes audio from an audio call. The instructions further cause the at least one processing unit to truncate each audio file in the set of audio files to a defined call length. For each audio call in the set of audio calls, the instructions also cause the at least one processing unit to receive a transcript of the audio call based on the audio file of the audio call. For each audio call in the set of audio calls, the instructions further cause the at least one processing unit to use the transcript of the audio call as input to a machine learning model for the machine learning model to predict a category from a plurality of categories that is associated with the audio call.

In some embodiments, the instructions may further cause the at least one processing unit to, for each audio file in the set of audio files, send the audio file to a third-party transcription service; and, for each audio file in the set of audio files, receive from the transcript of the audio file from the third-party transcription service. The third-party transcription service may generate the transcript by converting the audio file to text using a speech-to-text algorithm.

In some embodiments, the instructions may further cause the at least one processing unit to receive a list of the set of audio calls from a third-party system configured to manage audio calls received at customer support centers and send the third-party system a request for metadata associated with the set of audio calls. The metadata may include locations of the set of audio files of the audio calls. The instructions may also cause the at least one processing unit to retrieve the set of audio files of the set of audio calls from the locations. Receiving the set of audio files may include retrieving the set of audio files. The instructions may further cause the at least one processing unit to store the set of metadata associated with the set of audio calls and the categories associated with the set of audio calls in a storage. The set of transcripts of the set of audio calls and the categories associated with the set of transcripts of the set of audio calls stored in the storage may be used by a cloud computing system to generate visualizations for a client device.

In some embodiments, each audio file in the set of audio files may include a recording of a customer support session. Each category in the plurality of categories may represent a closure classification for a particular customer support session.

The following detailed description and accompanying drawings provide a better understanding of the nature and advantages of various embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for categorizing audio calls based on machine learning models. In some embodiments, a computing system may retrieve data associated with several audio calls from an audio call management system. The data can include audio recordings of the audio calls, the contact numbers that were called to initiate the audio calls, the times that the audio calls were received, references to personnel that handled the audio calls, etc. Next, the computing system truncates the audio recordings to a defined call length (e.g., the last five minutes of the audio calls, the last ten minutes of the audio calls, the last fifteen minutes of the audio calls, etc.). Then, the computing system performs speech recognition operations on the truncated audio recordings in order to translate the contents of the audio calls to text form. Once the computing system has the text form of the truncated audio recordings, the computing system uses a machine learning model to determine the outcome of each audio call based on the text of the audio recording of the audio call. Finally, the computing system stores the determined outcomes for the audio calls. Another computing system can use and analyze the determine outcomes in order to provide a client device a variety of different visualizations showing different aspects of the categorized audio calls.

The techniques described in the present application provide a number of benefits and advantages over conventional methods of determining threshold values for sets of data. For instance, by using a machine learning model that has been trained to predict categories for audio calls, the computing system is able to categorize audio calls more accurately than conventional methods for categorizing audio calls. Moreover, by truncating the audio recordings and using the truncated audio recordings to categorize audio calls, the computing system can categorize audio calls faster because the computing system does not have to process the entire audio recordings.

Figure 1:
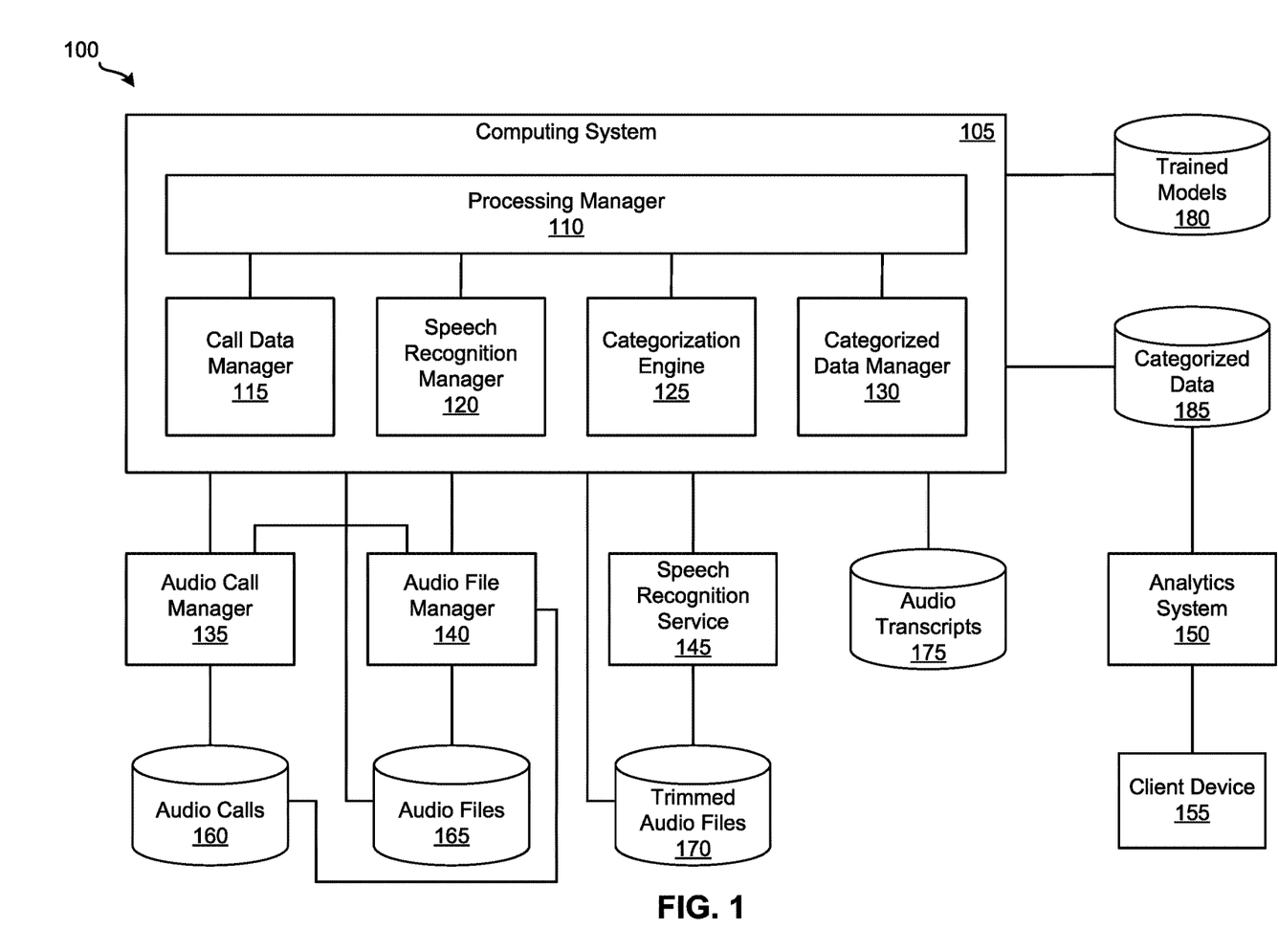
FIG. 1 illustrates a system for categorizing audio calls according to some embodiments.

FIG. 1 illustrates a system 100 for determining threshold values based on sampled data according to some embodiments. As shown, system 100 includes computing system 105, audio call manager 135, audio file manager 140, speech recognition service 145, analytics system 150, client device 155, and storages 160-185. Although FIG. 1 shows audio call manager 135, audio file manager 140, speech recognition service 145, and analytics system 150 as being external to computing system 105, one of ordinary skill in the art will understand that one or more of audio call manager 135, audio file manager 140, speech recognition service 145, and analytics system 150 may be part of computing system 105 in some embodiments.

Audio calls storage 160 is configured to store audio call data. Examples of audio call data include computer files containing audio recordings of audio calls, file names of the computer files, contact numbers that were called to initiate the audio calls, caller information (e.g., name of a caller, a name of a company associated with the caller, etc.), timestamps of times at which the audio calls were received, identifiers (IDs) of agents that handled the audio calls, support areas, whether a call was disconnected (e.g., dropped), etc. In some embodiments, a support area is a classification of common topics used to group customer support agents so that customer support agents are able to build expertise in the classification of common topics in which they are grouped and then provide customer service to customers on those common topics. Examples of topics may include product information requests, product not working as expected, request for help using product or completing product related task, follow-up to previous inquiry, provide feedback good and bad, billing inquiry, account information update request, request for contract information, request for increase or decrease in licenses, etc.

Audio files storage 165 and trimmed audio files storage 170 may each store computer files containing audio recordings. The computer files stored in trimmed audio files storage 170 may be a truncated version of the computer files stored in audio files storage 165. In some embodiments, trimmed audio files storage 170 can be implemented as a cloud storage. Audio transcripts storage 175 is configured to store transcripts of audio recordings. The transcripts may be stored in the form of a text-based computer files. In some embodiments, audio transcripts storage 175 is implemented using a storage that is configured to store unstructured data (e.g., a semantic data lake storage). Categorized data storage 185 is configured to store audio calls and categories associated with the audio calls.

Trained models storage 180 can store trained machine learning (ML) models. Once trained, an ML model is configured to predict some output given a particular input. For example, an ML model can be trained to predict a category from several possible categories (also referred to as closure categories or closure classifications) that is associated with an audio call given a transcript of a recording of the audio call. Examples of such categories include confirmation, dissatisfaction, customer follow-up action, company follow-up action, customer ineligible, request is out of scope, and refer to partner for support. In some embodiments, a ML model predicts a category from several possible categories by determining a confidence score for each of the several categories based on a transcript of a recording of an audio call. The ML model selects the category with the highest confidence score to be the category predicted to be associated with the audio call.

In some embodiments, the ML models stored in trained models storage 180 may be implemented using a transformer-based model. Examples of transformer-based models include an XLNet model, a bidirectional encoder representations from transformers (BERT) model, a robustly optimized BERT (RoBERTa) model, a distilled version of BERT (DistilBERT) model, a cross-lingual language model (XLM), etc. One of ordinary skill in the art will realize that any type of language model can be used to implement an ML model stored in trained models storage 180. Trained models storage 180 can store several different trained ML models that are each configured to predict categories associated with audio calls based on transcripts of recordings of the audio calls. Some of these different ML models may be implemented using the same language model. For instance, a few of the ML models can be each implemented using an XLNet model with different weight values. As such, each of these XLNet models may predict different categories or the same category with different confidence scores associated with an audio call based on a transcript of a recording of the audio call. Still, some of the different ML models can be implemented using different language models. For example, a first ML model may be implemented using a BERT model, a second ML model may be implemented using an XLNet model, a third ML model may be implemented using an XLM language model, and so on and so forth. Any combination of ML models implemented using the same and/or different language models are possible.

In some embodiments, storages 160-185 are implemented in a single physical storage while, in other embodiments, storages 160-185 may be implemented across several physical storages. While FIG. 1 shows storages 160-185 as external to computing system 105, one of ordinary skill in the art will appreciate that one or more of audio calls storage 160, audio files storage 165, trimmed audio files storage 170, audio transcripts storage 175, trained models storage 180, and categorized data storage 185 may be part of computing system 105 in some embodiments.

As shown in FIG. 1, computing system 105 includes processing manager 110, call data manager 115, speech recognition manager 120, categorization engine 125, and categorized data manager 130. Processing manager 110 is responsible for managing the processing of audio calls. For example, at defined intervals (e.g., once every twelve hours, once a day, once every three days, once a week, etc.), processing manager 110 initiates the processing of recent audio calls (e.g., audio calls that occurred since the last time audio calls were processed). In some embodiments, processing manager 110 starts the processing by sending call data manager 115 a request for data associated with the recent audio calls. After receiving from call data manager 115 metadata associated with the recent audio calls and locations of audio recordings of the audio calls, processing manager 110 sends speech recognition manager 120 the locations of the audio recordings of the recent audio calls and a request to perform speech recognition operations on the recent audio calls. In return, processing manager 110 receives transcripts of the audio calls from speech recognition manager 120. Next, processing manager 110 sends categorization engine 125 the metadata associated with the recent audio calls, the transcripts of the recent audio calls, and a request to categorize the recent audio calls. Upon receiving the categories associated with the recent audio calls, processing manager 110 sends categorized data manager 130 the metadata associated with the audio calls and the categories associated with the audio calls.

Call data manager 115 is configured to manage call data associated with audio calls. For instance, when call data manager 115 receives from processing manager 110 a request for data associated with recent audio calls, call data manager 115 sends audio call manager 135 a request for a list of audio calls that occurred since the last request call data manager 115 sent to audio call manager 135. Next, call data manager 115 sends audio call manager 135 a request for metadata associated with the audio calls in the list of audio calls. Examples of metadata associated with an audio call includes a file name of a computer file containing an audio recording of the audio call, a contact number that was called to initiate the audio call, a timestamp of the time at which the audio call was received, an ID of an agent that handled the audio call, a support area, etc. Once call data manager 115 receives the metadata associated with the recent audio calls from audio call manager 135, call data manager 115 sends the metadata to processing manager 110.

In some embodiments, instead of sending audio call manager 135 a request for a list of recent audio calls, call data manager 115 receives a list of audio calls from audio call manager 135 at defined intervals (e.g., once an hour, once a day, once every three days, once a week, etc.). In some such embodiments, when call data manager 115 receives from processing manager 110 a request for data associated with recent audio calls, call data manage 115 sends audio call manager 135 a request for metadata associated with audio calls in the list(s) received from audio call manager 135 (e.g., audio calls in all the lists received from audio call manager 135 since the last request call data manager 115 received from processing manager 110) and retrieves the audio recordings of the audio calls from audio files storage 165.

After call data manager 115 sends the metadata to processing manager 110, call data manager 115 retrieves the audio recordings of the audio calls from audio files storage 165 based on the file names of the audio recordings of the audio calls specified in the metadata. Next, call data manager 115 truncates the audio recordings of the audio calls to a defined call length (e.g., the last five minutes of the audio calls, the last ten minutes of the audio calls, the last fifteen minutes of the audio calls, etc.) and stores them in trimmed audio files storage 170. Then, call data manager 115 sends the locations (e.g., uniform resource locators (URLs) pointing to the trimmed audio files) to processing manager 110.

Speech recognition manager 120 handles the speech recognition processing of audio calls. For example, speech recognition manager 120 can receive from processing manager 110 locations of audio recordings of audio calls and a request to perform speech recognition operations on the audio calls. In response to the request, speech recognition manager 120 sends speech recognition service 145 the locations of the audio recordings of the audio calls and a request to perform speech recognition operations on the audio recordings. In return, speech recognition manager 120 receives transcripts of the audio recordings from speech recognition service 145. Speech recognition manager 120 forwards the transcripts to processing manager 110.

Categorization engine 125 is configured to determine categories associated with audio calls. For instance, categorization engine 125 may receive from processing manager 110 metadata associated with the audio calls, transcripts of the audio calls, and a request to categorize the audio calls. In response, categorization engine 125 determines a category from several possible categories that is associated with each audio call. In some embodiments, categorization engine 125 determines a category associated with an audio call by using a defined ML model stored in trained models storage 180. As mentioned above, a trained ML model stored in trained models storage 180 is configured to predict some output given a particular input. In this example, the defined ML model that categorization engine 125 uses is trained to predict a category from several possible categories that is associated with an audio call based on a transcript of a recording of the audio call. Once categorization engine 125 determines categories for the audio calls, categorization engine 125 sends them to processing manager 110. Also, categorization engine 125 stores the transcripts of the recordings of the audio calls in audio transcripts storage 175.

Categorized data manager 130 is responsible for managing categorized audio calls. For example, categorized data manager 130 can receive from processing manager 110 metadata associated with audio calls and categories associated with the audio calls. When categorized data manager 130 receives such data, categorized data manager 130 stores the data in categorized data storage 185.

Audio call manager 135 is configured to manage audio calls. For instance, audio call manager 135 provides an automatic call distribution (ACD) service that answers and distributes incoming audio calls to agents responsible for handling the calls. In some embodiments, audio call manager 135 may be implemented in a third-party system. Audio call manager 135 may handle requests for recent audio calls. For example, in some embodiments, audio call manager 135 can receive from call data manager 115 a request for a list of audio calls that occurred since the last request audio call manager 135 received from call data manager 115. In response, audio call manager 135 identifies such audio calls, generates a list of the identified audio calls, and sends the list to call data manager 115. In other embodiments, audio call manager 135 may generate a list of the most recent calls at defined intervals (e.g., once an hour, once a day, once every three days, once a week, etc.). In some such other embodiments, audio call manager 135 sends the list to audio file manager 140. Audio call manager 135 can also send the list to call data manager 115 in some cases.

Audio call manager 135 is also configured to handle request for metadata associated with audio calls. For instance, audio call manager 135 can receive from call data manager 115 a request for metadata associated with audio calls. In response to such a request, audio call manager 135 accesses audio calls storage 160, retrieves the metadata associated with the requested audio calls, and sends them to call data manager 115. In addition, audio call manager 135 can provide recordings of audio calls to audio file manager 140. In some instances, audio call manager 135 may receive from audio file manager 140 a request for recordings of a set of audio calls. In response, audio call manager 135 accesses audio calls storage 160, retrieves the recordings of the requested audio calls, and sends them to audio file manager 140. In other instances, audio call manager 135 provides a service (e.g., a file transfer protocol (FTP) service) through which audio file manager 140 can retrieve the recordings of the requested audio calls.

Audio file manager 140 is responsible for managing audio files. For instance, when audio file manager 140 receives a list of audio calls from audio call manager 135, audio file manager 140 sends audio call manager 135 a request for recordings of the audio calls in the list. In return, audio file manager 140 receives the recordings of the requested audio calls from audio call manager 135. In some embodiments where audio call manager 135 provides recordings of audio calls through a service, audio file manager 140 retrieves the recordings through the service instead of requesting them from audio call manager 135. Upon receiving the recordings, audio file manager 140 stores them in audio files storage 165. In some embodiments, audio file manager 140 is implemented in a third-party travel and expense management system.

Speech recognition service 145 is configured to perform speech recognition operations on audio recordings of audio calls. For example, speech recognition service 145 may receive from speech recognition manager 120 locations (e.g., URLs) of audio recordings in trimmed audio files storage 170 and a request to perform speech recognition operations on these audio recordings. In response, speech recognition service 145 accesses trimmed audio files storage 170 and retrieves the requested audio recordings based on the received locations of the recordings. Speech recognition service 145 then translates the audio recordings into text in the form of transcripts and sends the transcripts to speech recognition manager 120. In some embodiments, speech recognition service 145 can be implemented as a third-party service provided by a third-party system.

Analytics system 150 serves to analyze data and discover insights into the data. In some embodiments, the data that analytics system 150 analyzes is data stored in categorized data storage 185. As such, in some such embodiments, analytics system 150 is configured to synchronize with the data stored in categorized data storage 185. Analytics system 150 can provide insights into data by providing visualizations of data stored in categorized data storage 185. For instance, analytics system 150 may receive a request for a particular visualization of data from client device 155. In response to the request, analytics system 150 retrieves the requested data from categorized data storage 185 and generates the visualization using the data. To generate a visualization, analytics system 150 may associate call data with operational data stored in a customer relationship management (CRM) system (not shown). The operational data can include account data. In some embodiments, analytics system 150 associates call data with operational data by using metadata from a call and account data from the operational data. For example, analytics system 150 may match the name of the caller of a call and the name of the company associated with the caller specified in the metadata of the call with an account in the CRM system. Then, analytics system 150 provides the visualization to client device 155. In some embodiments, analytics system 150 can be implemented by a third-party system.

Client device 155 can be configured to communicate and interact with analytics system 150. For example, client device 155 may send (e.g. via a client application (e.g., a desktop application, a mobile application, a web browser, etc.) operating on client device 155) analytics system 150 a request for a visualization of data. In return, client device 155 can receive the visualization from analytics system 150. Client device 155 then presents the visualization (e.g., on a display of client device 155) for viewing.

Figure 2:
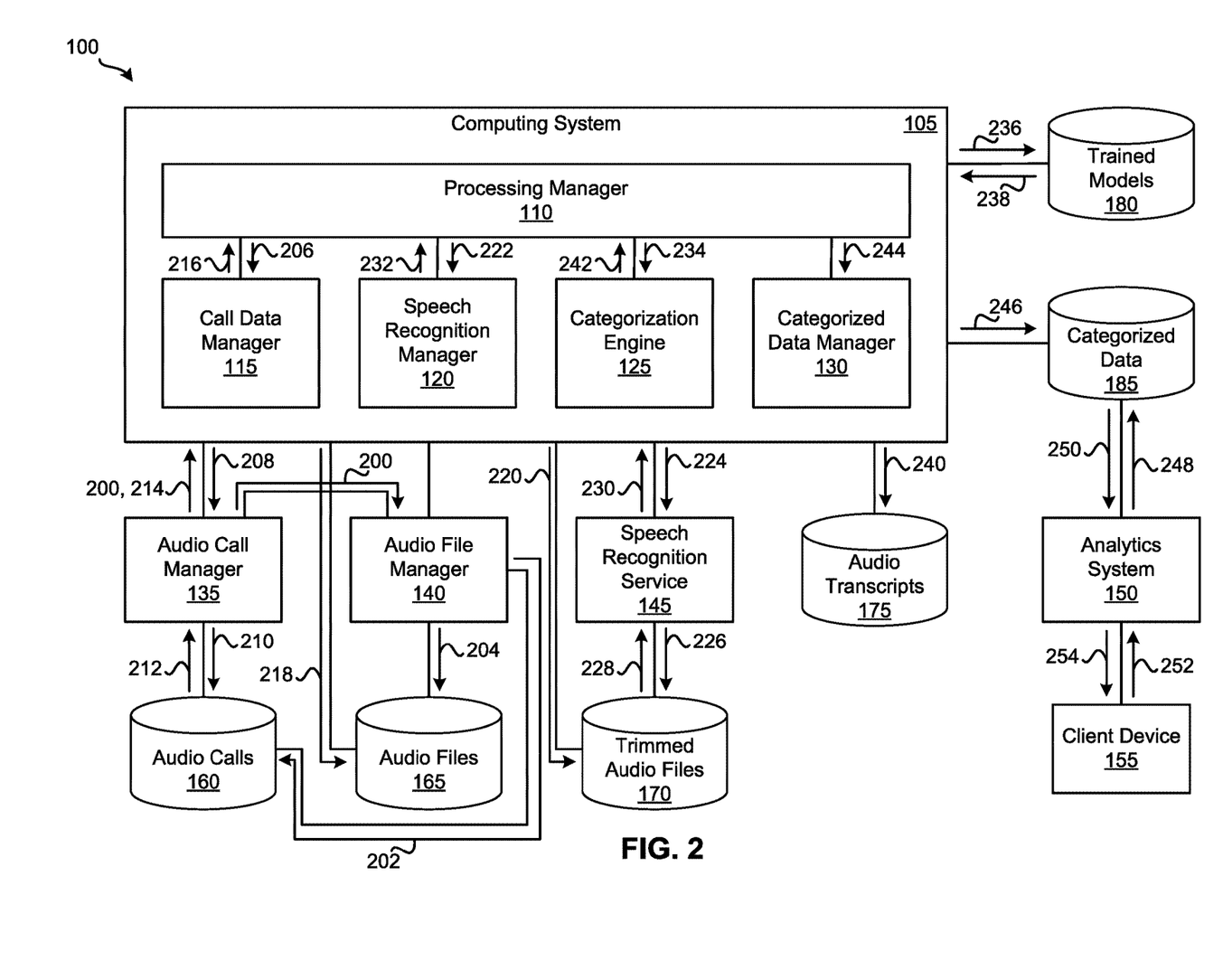
FIG. 2 illustrates an example dataflow through the system illustrated in FIG. 1 according to some embodiments.

FIG. 2 illustrates an example dataflow through system 100 according to some embodiments. The example dataflow starts by audio call manager 135 generating, at a defined interval, a list of recent audio calls and sending, at 200, the list to audio file manager 140 and call data manager 115. For this example, audio call manager 135 provides recordings of audio calls through a service through which recordings of audio calls can be retrieved. Thus, upon receiving the list of audio calls, audio file manager 140 retrieves, at 202, the recordings of the audio calls in the list through the service provided by audio call manager 135. Then, audio file manager 140 stores, at 204, the recordings in audio files storage 165.

Next, processing manager 110 initiates, at an interval defined for processing manager 110, the processing of recent audio calls. Processing manager 110 beings the processing by sending, at 206, call data manager 115 a request for data associated with the recent audio calls. Once call data manager 115 receives the request from processing manager 110, call data manager 115 sends, at 208, audio call manager 135 a request for metadata associated with the audio calls in the list received from audio call manager 135. When audio call manager 135 receives the request, audio call manager 135 accesses, at 210, audio calls storage 160, retrieves, at 212, the metadata associated with the requested audio calls, and sends, at 214, them to call data manager 115, which forwards, at 216 the metadata to processing manager 110. Then, call data manager 115 retrieves, at 218, the audio recordings of the audio calls from audio files storage 165 based on the file names of the audio recordings of the audio calls specified in the metadata. Once call data manager 115 has the audio recordings, call data manager 115 truncates the audio recordings of the audio calls to a defined call length, which is the last ten minutes of the audio calls in this example. Call data manager 115 stores, at 220, the truncated audio recordings in trimmed audio files storage 170 and sends the locations (e.g., URLs pointing to the trimmed audio files) to processing manager 110.

After receiving the metadata associated with the recent audio calls and the locations of audio recordings of the audio calls, processing manager 110 sends, at 222, speech recognition manager 120 the locations of the audio recordings of the recent audio calls and a request to perform speech recognition operations on the recent audio calls. In response, speech recognition manager 120 sends, at 224, speech recognition service 145 the locations of the audio recordings of the audio calls and a request to perform speech recognition operations on the audio recordings. Upon receiving the locations of the audio recordings and the request, speech recognition service 145 accesses, at 226, trimmed audio files storage 170 and retrieves, at 228, the requested audio recordings based on the received locations of the recordings. Next, speech recognition service 145 translates the audio recordings into text in the form of transcripts and sends, at 230, the transcripts to speech recognition manager 120. When speech recognition manager 120 receives transcripts of the audio recordings, speech recognition manager 120 forwards, at 232, them to processing manager 110.

After 232, processing manager 110 sends, at 234, categorization engine 125 the metadata associated with the recent audio calls, the transcripts of the recent audio calls, and a request to categorize the recent audio calls. Upon receiving the data from processing manager 110, categorization engine 125 determines a category from several possible categories that is associated with each audio call. For this example, categorization engine 125 determines a category associated with an audio call by using a defined ML model stored in trained models storage 180. Thus, categorization engine 125 accesses, at 236, trained models storage 180 and retrieves, at 238, the defined ML model to use to determine categories for the audio calls. After categorization engine 125 determines categories for the audio calls, categorization engine 125 stores, at 240, the transcripts of the recordings of the audio calls in audio transcripts storage 175 and sends, at 242, the categories associated with the audio calls to processing manager 110.

Next, processing manager 110 sends, at 244, categorized data manager 130 the metadata associated with the audio calls and the categories associated with the audio calls after processing manager 110 receives the categories from categorization engine 125. Categorized data manager 130 stores, at 246, the data in categorized data storage 185. At some later point in time, synchronizes, at 248 and 250, with the data stored in categorized data storage 185. In this example, analytics system 150 then receives, at 252, a request for a particular visualization of data from client device 155. In response to the request, analytics system 150 retrieves the requested data from categorized data storage 185 and generates the visualization using the data. Finally, analytics system 150 provides, at 254, the visualization to client device 155, which presents the visualization on a display of client device 155 for viewing.

Figure 3:
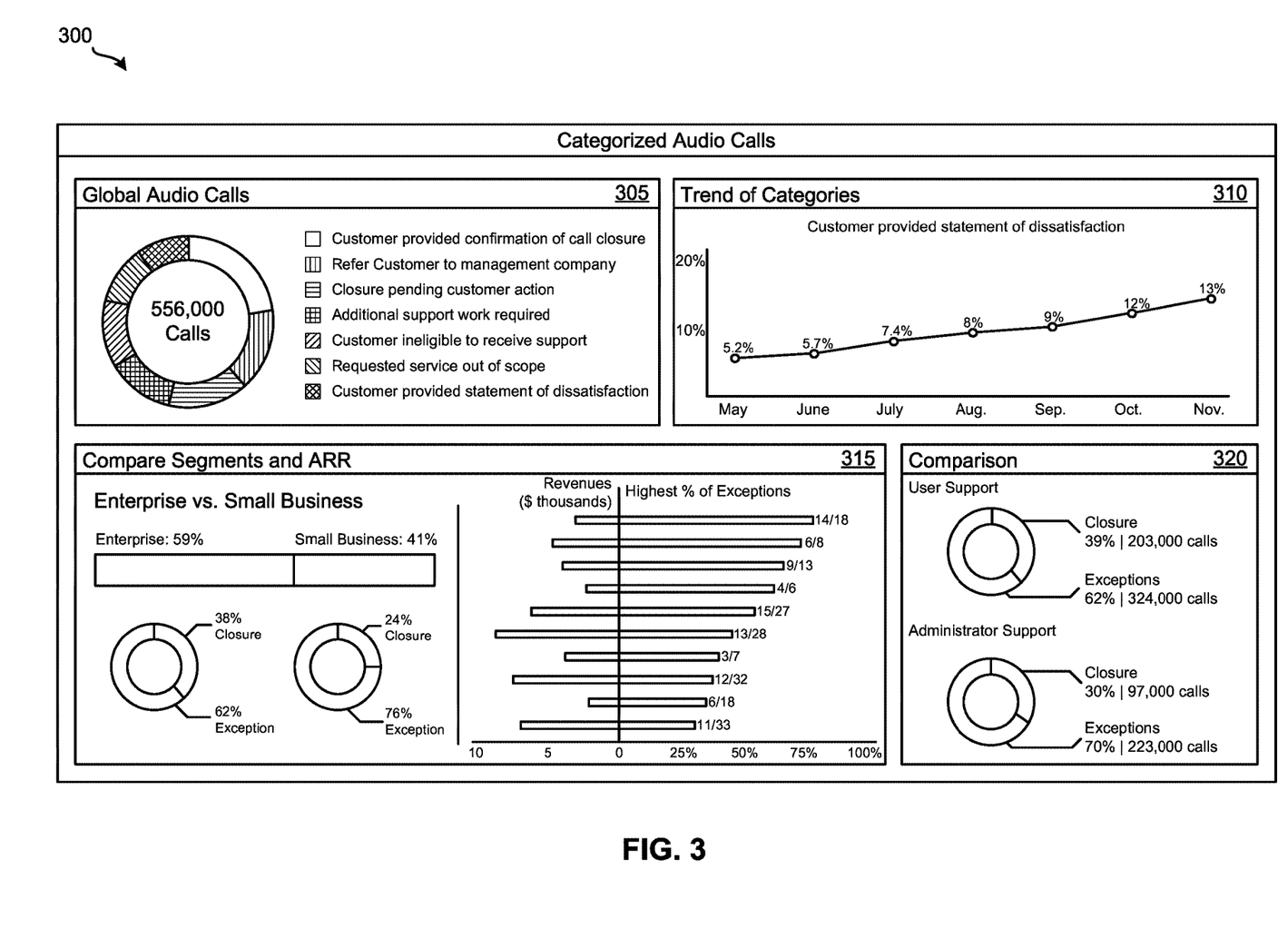
FIG. 3 illustrates a graphical user interface (GUI) that includes example visualizations according to some embodiments.

FIG. 3 illustrates GUI 300 that includes example visualizations according to some embodiments. As shown, GUI 300 includes visualizations 305-320. Visualization 305 shows a breakdown of global audio calls according to categories associated with the audio calls. The categories for this example include a confirmation category, a refer to partner for support category, a customer follow-up action category, a company follow-up action category, a customer ineligible category, a request is out of scope category, and a dissatisfaction category. The confirmation category is represented by white, the refer to partner for support category is represented by vertical lines, the customer follow-up action category is represented by horizontal lines, the company follow-up action category is represented by vertical and horizontal lines, the customer ineligible category is represented by left-slanting diagonal lines, the request is out of scope category is represented by right-slanting diagonal lines, and the dissatisfaction category is represented by left-slanting and right-slanting diagonal lines. Visualization 310 depicts a graph of a trend line for audio calls categorized in the dissatisfaction category. The graph represents the percentage of all calls categorized in the dissatisfaction category for each month. The left hand side of visualization 315 illustrates a comparison between audio calls for enterprises and audio calls for small businesses in terms of the percentage of calls resulting in closure and the percentage of calls resulting in exceptions. The right hand side of visualization 315 shows annual returning revenue in terms of revenue amounts and percentages of audio calls resulting in exceptions. Visualization 320 depicts a comparison between user support audio calls and administrator support audio calls in terms of the percentage of audio calls resulting in closure and the percentage of audio calls resulting in exceptions. In some embodiments, client device 155 can request any one of the visualizations 305-320 from analytics system 150 or any combination thereof. For instance, client device 155 may sends analytics system 150 a request for all four visualizations 305-320 and, in response, analytics system 150 may provide GUI 300 to client device 155. One of ordinary skill in the art will understand that client device 155 may request visualizations that show calls and/or closure classifications grouped by any number of different criteria. For example, client device 155 may request visualizations of calls group the calls and/or closure categories that are grouped by industry, regional, revenue segments, business groups, support managers, etc.

Figure 4:
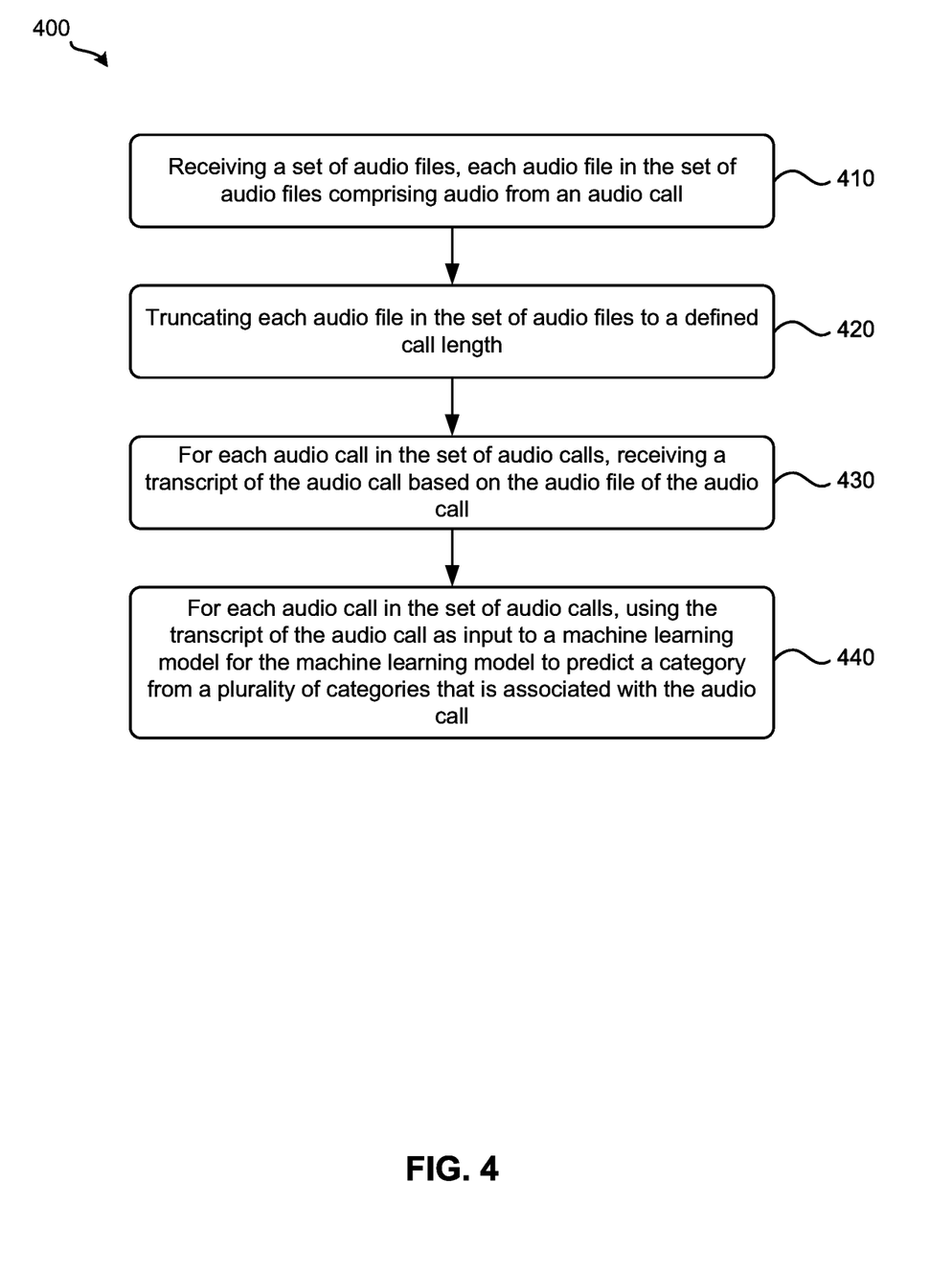
FIG. 4 illustrates a process for categorizing audio calls according to some embodiments.

FIG. 4 illustrates a process 400 for categorizing audio calls according to some embodiments. In some embodiments, computing system 105 may perform process 400. Process 400 starts by receiving, at 410, a set of audio files. Each audio file in the set of audio files includes audio from an audio call. Referring to FIGS. 1 and 2 as an example, processing manager 110 can send call data manager 115 a request for data associated with the recent audio calls. In response to the request, call data manager 115 sends audio call manager 135 a request for metadata associated with the audio calls in the list received from audio call manager 135 and, in return, receives the metadata associated with the requested audio calls from audio call manager 135. Call data manager 115 forwards the metadata to processing manager 110.

Next, process 400 truncates, at 420, each audio file in the set of audio files to a defined call length. Continuing with the example above, call data manager 115 retrieves the audio recordings of the audio calls from audio files storage 165 based on the file names of the audio recordings of the audio calls specified in the metadata. Then, for each audio file, call data manager 165 truncates the audio file to a defined call length and stores the truncated audio recording in trimmed audio files storage 170. After truncating all the audio files, call data manager 115 sends the locations of the truncated audio files to processing manager 110.

Then, for each audio call in the set of audio calls, process 400 receives, at 430, a transcript of the audio call based on the audio file of the audio call. Continuing with the example above, processing manager 110 sends speech recognition manager 120 the locations of the audio recordings of the recent audio calls and a request to perform speech recognition operations on the recent audio calls. In response to the request, speech recognition manager 120 sends speech recognition service 145 the locations of the audio recordings of the audio calls and a request to perform speech recognition operations on the audio recordings. Speech recognition service 145 then accesses trimmed audio files storage 170, retrieves the requested audio recordings based on the received locations of the recordings, translates the audio recordings into text in the form of transcripts, and sends the transcripts to speech recognition manager 120. When speech recognition manager 120 receives transcripts of the audio recordings, speech recognition manager 120 forwards them to processing manager 110.

Finally, for each audio call in the set of audio calls, process 400 uses, at 440, the transcript of the audio call as input to a machine learning model for the machine learning model to predict a category from a plurality of categories that is associated with the audio call. Continuing with the an example above, processing manager 110 sends categorization engine 125 the metadata associated with the recent audio calls, the transcripts of the recent audio calls, and a request to categorize the recent audio calls. Then, categorization engine 125 uses the transcript of each audio call as input to a machine learning model for the machine learning model to predict a category from the several possible categories that is associated with the audio call. Categorization engine 125 accesses trained models storage 180 and retrieves the defined ML model to use to predict categories for the audio calls. Categorization engine 125 stores the transcripts of the recordings of the audio calls in audio transcripts storage 175 and sends the categories associated with the audio calls to processing manager 110.

Figure 5:
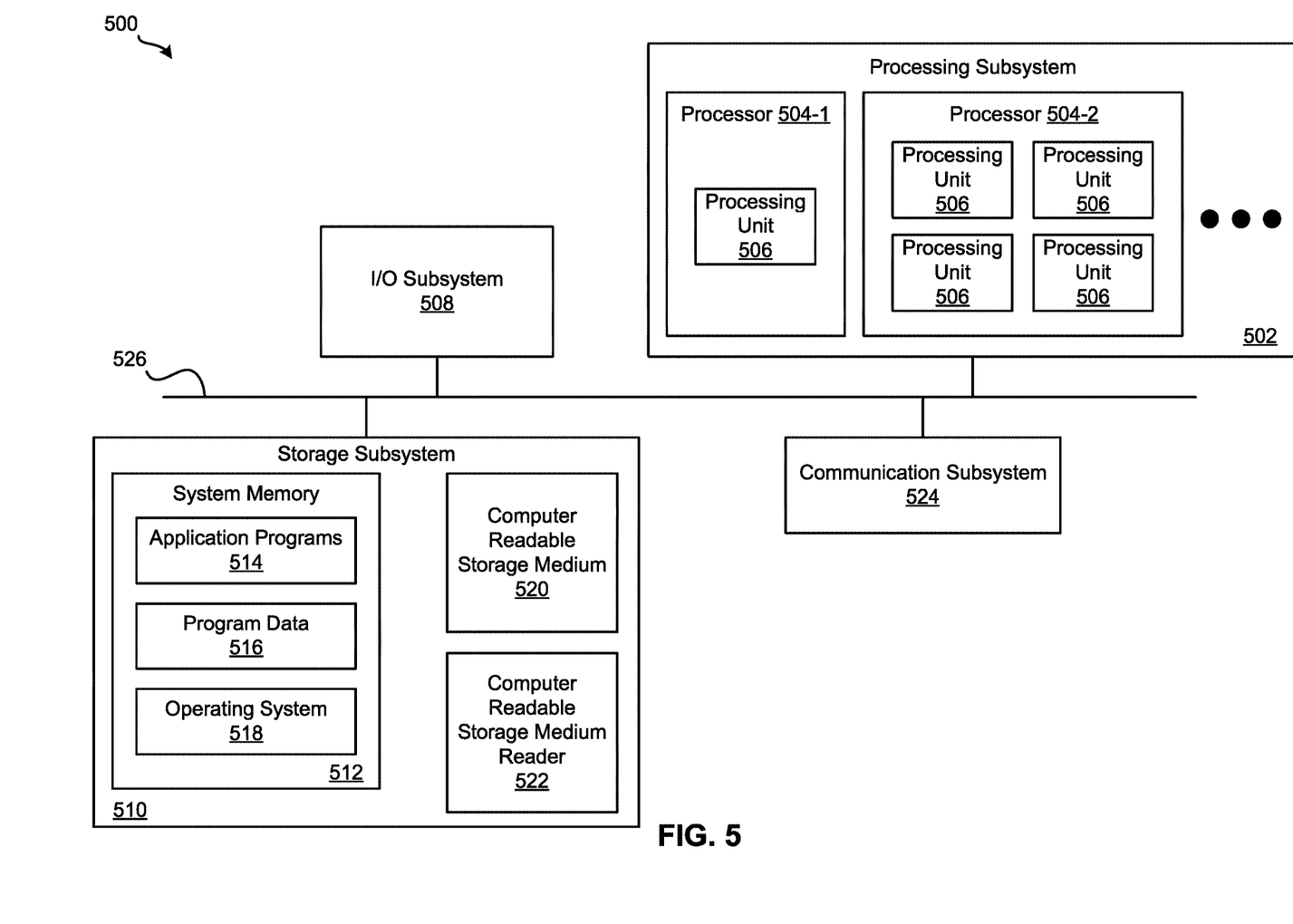
FIG. 5 illustrates an exemplary computer system, in which various embodiments may be implemented.

FIG. 5 illustrates an exemplary computer system 500 for implementing various embodiments described above. For example, computer system 500 may be used to implement systems computing system 105, audio call manager 135, audio file manager 140, speech recognition service 145, analytics system 150, and client device 155. Computer system 500 may be a desktop computer, a laptop, a server computer, or any other type of computer system or combination thereof. Some or all elements of call data manager 115, speech recognition manager 120, categorization engine 125, categorization data manager 130, audio call manager 135, audio file manager 140, speech recognition service 145, or combinations thereof can be included or implemented in computer system 500. In addition, computer system 500 can implement many of the operations, methods, and/or processes described above (e.g., process 400). As shown in FIG. 5, computer system 500 includes processing subsystem 502, which communicates, via bus subsystem 526, with input/output (I/O) subsystem 508, storage subsystem 510 and communication subsystem 524.

Bus subsystem 526 is configured to facilitate communication among the various components and subsystems of computer system 500. While bus subsystem 526 is illustrated in FIG. 5 as a single bus, one of ordinary skill in the art will understand that bus subsystem 526 may be implemented as multiple buses. Bus subsystem 526 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 502, which can be implemented as one or more integrated circuits (e.g., a conventional microprocessor or microcontroller), controls the operation of computer system 500. Processing subsystem 502 may include one or more processors 504.

Each processor 504 may include one processing unit 506 (e.g., a single core processor such as processor 504-1) or several processing units 506 (e.g., a multicore processor such as processor 504-2). In some embodiments, processors 504 of processing subsystem 502 may be implemented as independent processors while, in other embodiments, processors 504 of processing subsystem 502 may be implemented as multiple processors integrate into a single chip or multiple chips. Still, in some embodiments, processors 504 of processing subsystem 502 may be implemented as a combination of independent processors and multiple processors integrated into a single chip or multiple chips.

In some embodiments, processing subsystem 502 can execute a variety of programs or processes in response to program code and can maintain multiple concurrently executing programs or processes. At any given time, some or all of the program code to be executed can reside in processing subsystem 502 and/or in storage subsystem 510. Through suitable programming, processing subsystem 502 can provide various functionalities, such as the functionalities described above by reference to process 400.

I/O subsystem 508 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 500 to a user or another device (e.g., a printer).

As illustrated in FIG. 5, storage subsystem 510 includes system memory 512, computer-readable storage medium 520, and computer-readable storage medium reader 522. System memory 512 may be configured to store software in the form of program instructions that are loadable and executable by processing subsystem 502 as well as data generated during the execution of program instructions. In some embodiments, system memory 512 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 512 may include different types of memory, such as static random access memory (SRAM) and/or dynamic random access memory (DRAM). System memory 512 may include a basic input/output system (BIOS), in some embodiments, that is configured to store basic routines to facilitate transferring information between elements within computer system 500 (e.g., during start-up). Such a BIOS may be stored in ROM (e.g., a ROM chip), flash memory, or any other type of memory that may be configured to store the BIOS.

As shown in FIG. 5, system memory 512 includes application programs 514, program data 516, and operating system (OS) 518. OS 518 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 520 may be a non-transitory computer-readable medium configured to store software (e.g., programs, code modules, data constructs, instructions, etc.). Many of the components (e.g., call data manager 115, speech recognition manager 120, categorization engine 125, categorization data manager 130, audio call manager 135, audio file manager 140, and speech recognition service 145) and/or processes (e.g., process 400) described above may be implemented as software that when executed by a processor or processing unit (e.g., a processor or processing unit of processing subsystem 502) performs the operations of such components and/or processes. Storage subsystem 510 may also store data used for, or generated during, the execution of the software.

Storage subsystem 510 may also include computer-readable storage medium reader 522 that is configured to communicate with computer-readable storage medium 520. Together and, optionally, in combination with system memory 512, computer-readable storage medium 520 may comprehensively represent remote, local, fixed, and/or removable storage devices plus storage media for temporarily and/or more permanently containing, storing, transmitting, and retrieving computer-readable information.

Computer-readable storage medium 520 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 524 serves as an interface for receiving data from, and transmitting data to, other devices, computer systems, and networks. For example, communication subsystem 524 may allow computer system 500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 524 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 524 may provide components configured for wired communication (e.g., Ethernet) in addition to or instead of components configured for wireless communication.

One of ordinary skill in the art will realize that the architecture shown in FIG. 5 is only an example architecture of computer system 500, and that computer system 500 may have additional or fewer components than shown, or a different configuration of components. The various components shown in FIG. 5 may be implemented in hardware, software, firmware or any combination thereof, including one or more signal processing and/or application specific integrated circuits.

Figure 6:
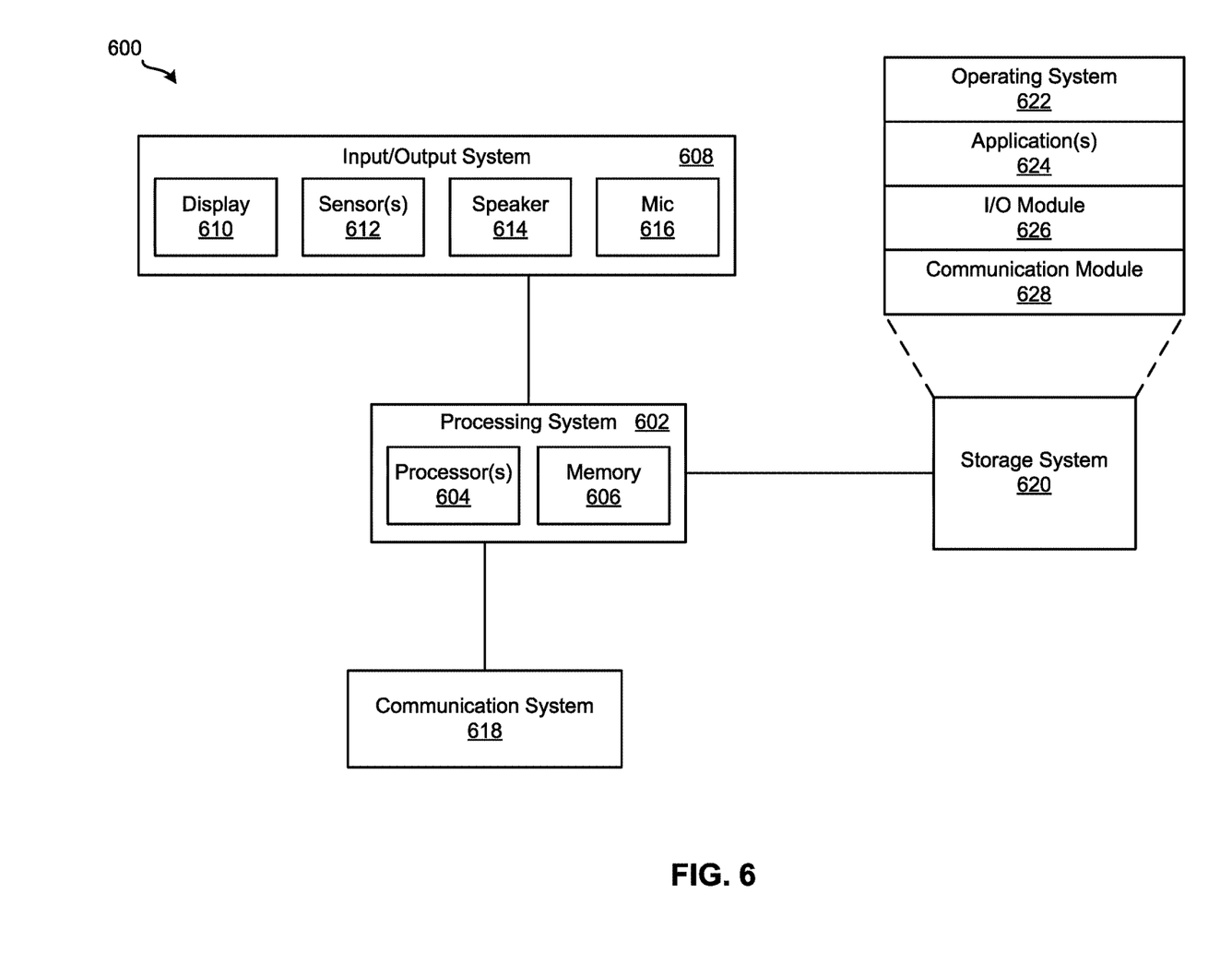
FIG. 6 illustrates an exemplary computing device, in which various embodiments may be implemented.

FIG. 6 illustrates an exemplary computing device 600 for implementing various embodiments described above. For example, computing device 600 may be used to implement devices client device 155. Computing device 600 may be a cellphone, a smartphone, a wearable device, an activity tracker or manager, a tablet, a personal digital assistant (PDA), a media player, or any other type of mobile computing device or combination thereof. As shown in FIG. 6, computing device 600 includes processing system 602, input/output (I/O) system 608, communication system 618, and storage system 620. These components may be coupled by one or more communication buses or signal lines.

Processing system 602, which can be implemented as one or more integrated circuits (e.g., a conventional microprocessor or microcontroller), controls the operation of computing device 600. As shown, processing system 602 includes one or more processors 604 and memory 606. Processors 604 are configured to run or execute various software and/or sets of instructions stored in memory 606 to perform various functions for computing device 600 and to process data.

Each processor of processors 604 may include one processing unit (e.g., a single core processor) or several processing units (e.g., a multicore processor). In some embodiments, processors 604 of processing system 602 may be implemented as independent processors while, in other embodiments, processors 604 of processing system 602 may be implemented as multiple processors integrate into a single chip. Still, in some embodiments, processors 604 of processing system 602 may be implemented as a combination of independent processors and multiple processors integrated into a single chip.

Memory 606 may be configured to receive and store software (e.g., operating system 622, applications 624, I/O module 626, communication module 628, etc. from storage system 620) in the form of program instructions that are loadable and executable by processors 604 as well as data generated during the execution of program instructions. In some embodiments, memory 606 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 608 is responsible for receiving input through various components and providing output through various components. As shown for this example, I/O system 608 includes display 610, one or more sensors 612, speaker 614, and microphone 616. Display 610 is configured to output visual information (e.g., a graphical user interface (GUI) generated and/or rendered by processors 604). In some embodiments, display 610 is a touch screen that is configured to also receive touch-based input. Display 610 may be implemented using liquid crystal display (LCD) technology, light-emitting diode (LED) technology, organic LED (OLED) technology, organic electro luminescence (OEL) technology, or any other type of display technologies. Sensors 612 may include any number of different types of sensors for measuring a physical quantity (e.g., temperature, force, pressure, acceleration, orientation, light, radiation, etc.). Speaker 614 is configured to output audio information and microphone 616 is configured to receive audio input.

One of ordinary skill in the art will appreciate that I/O system 608 may include any number of additional, fewer, and/or different components. For instance, I/O system 608 may include a keypad or keyboard for receiving input, a port for transmitting data, receiving data and/or power, and/or communicating with another device or component, an image capture component for capturing photos and/or videos, etc.

Communication system 618 serves as an interface for receiving data from, and transmitting data to, other devices, computer systems, and networks. For example, communication system 618 may allow computing device 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 618 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 618 may provide components configured for wired communication (e.g., Ethernet) in addition to or instead of components configured for wireless communication.

Storage system 620 handles the storage and management of data for computing device 600. Storage system 620 may be implemented by one or more non-transitory machine-readable mediums that are configured to store software (e.g., programs, code modules, data constructs, instructions, etc.) and store data used for, or generated during, the execution of the software.

In this example, storage system 620 includes operating system 622, one or more applications 624, I/O module 626, and communication module 628. Operating system 622 includes various procedures, sets of instructions, software components and/or drivers for controlling and managing general system tasks (e.g., memory management, storage device control, power management, etc.) and facilitates communication between various hardware and software components. Operating system 622 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 624 can include any number of different applications installed on computing device 600. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 626 manages information received via input components (e.g., display 610, sensors 612, and microphone 616) and information to be outputted via output components (e.g., display 610 and speaker 614). Communication module 628 facilitates communication with other devices via communication system 618 and includes various software components for handling data received from communication system 618.

One of ordinary skill in the art will realize that the architecture shown in FIG. 6 is only an example architecture of computing device 600, and that computing device 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
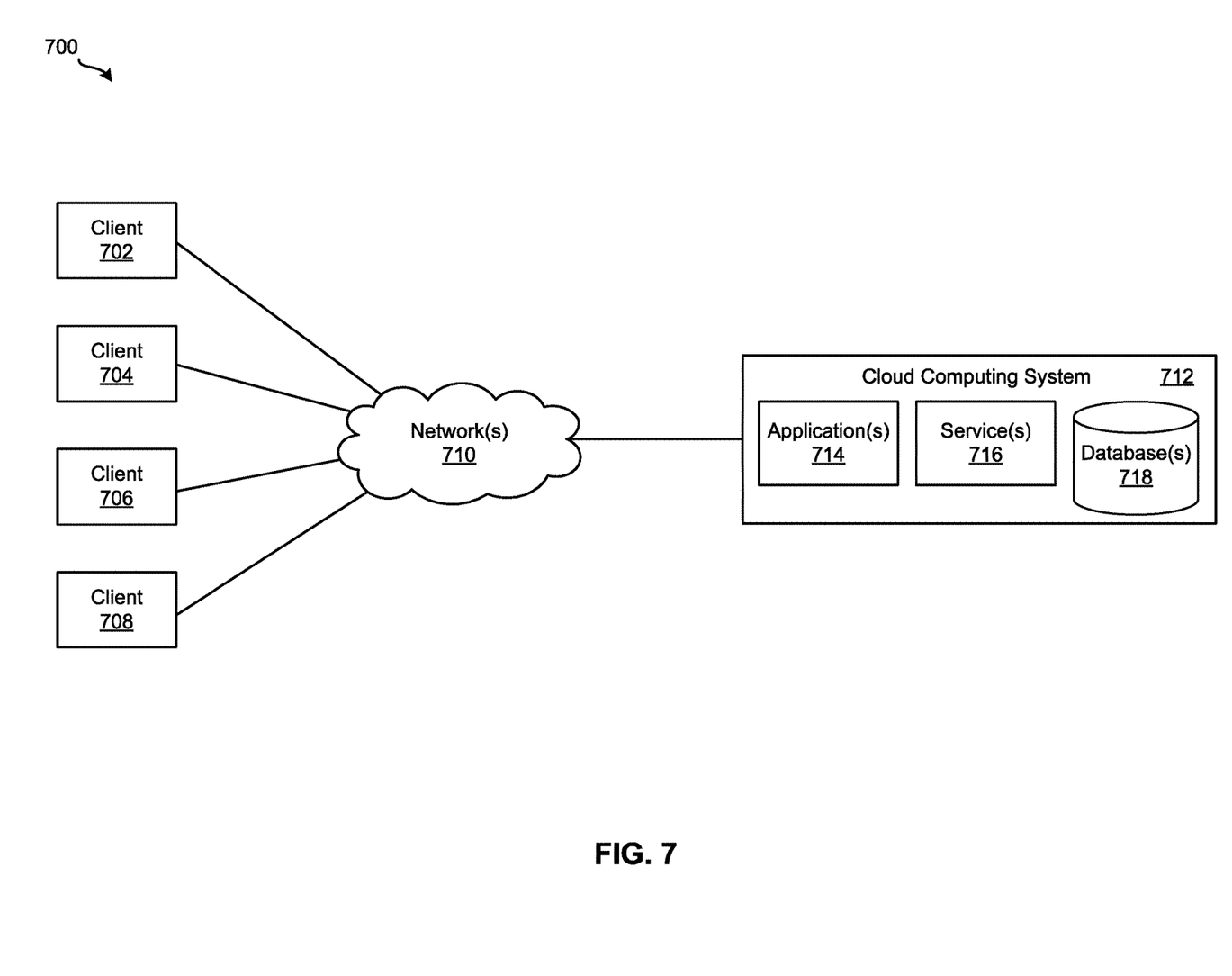
FIG. 7 illustrates an exemplary system, in which various embodiments may be implemented.

FIG. 7 illustrates an exemplary system 700 for implementing various embodiments described above. For example, cloud computing system 712 may be used to implement computing system 105, audio call manager 135, audio file manager 140, speech recognition service 145, and analytics system 150. In addition, one of client devices 702-708 may be used to implement client device 155. As shown, system 700 includes client devices 702-708, one or more networks 710, and cloud computing system 712. Cloud computing system 712 is configured to provide resources and data to client devices 702-708 via networks 710. In some embodiments, cloud computing system 700 provides resources to any number of different users (e.g., customers, tenants, organizations, etc.). Cloud computing system 712 may be implemented by one or more computer systems (e.g., servers), virtual machines operating on a computer system, or a combination thereof.

As shown, cloud computing system 712 includes one or more applications 714, one or more services 716, and one or more databases 718. Cloud computing system 700 may provide applications 714, services 716, and databases 718 to any number of different customers in a self-service, subscription-based, elastically scalable, reliable, highly available, and secure manner.

In some embodiments, cloud computing system 700 may be adapted to automatically provision, manage, and track a customer's subscriptions to services offered by cloud computing system 700. Cloud computing system 700 may provide cloud services via different deployment models. For example, cloud services may be provided under a public cloud model in which cloud computing system 700 is owned by an organization selling cloud services and the cloud services are made available to the general public or different industry enterprises. As another example, cloud services may be provided under a private cloud model in which cloud computing system 700 is operated solely for a single organization and may provide cloud services for one or more entities within the organization. The cloud services may also be provided under a community cloud model in which cloud computing system 700 and the cloud services provided by cloud computing system 700 are shared by several organizations in a related community. The cloud services may also be provided under a hybrid cloud model, which is a combination of two or more of the aforementioned different models.

In some instances, any one of applications 714, services 716, and databases 718 made available to client devices 702-708 via networks 710 from cloud computing system 700 is referred to as a "cloud service." Typically, servers and systems that make up cloud computing system 700 are different from the on-premises servers and systems of a customer. For example, cloud computing system 700 may host an application and a user of one of client devices 702-708 may order and use the application via networks 710.

Applications 714 may include software applications that are configured to execute on cloud computing system 712 (e.g., a computer system or a virtual machine operating on a computer system) and be accessed, controlled, managed, etc. via client devices 702-708. In some embodiments, applications 714 may include server applications and/or mid-tier applications (e.g., HTTP (hypertext transport protocol) server applications, FTP (file transfer protocol) server applications, CGI (common gateway interface) server applications, JAVA server applications, etc.). Services 716 are software components, modules, application, etc. that are configured to execute on cloud computing system 712 and provide functionalities to client devices 702-708 via networks 710. Services 716 may be web-based services or on-demand cloud services.

Databases 718 are configured to store and/or manage data that is accessed by applications 714, services 716, and/or client devices 702-708. For instance, one or more storages 160-185 may be stored in databases 718. Databases 718 may reside on a non-transitory storage medium local to (and/or resident in) cloud computing system 712, in a storage-area network (SAN), on a non-transitory storage medium local located remotely from cloud computing system 712. In some embodiments, databases 718 may include relational databases that are managed by a relational database management system (RDBMS). Databases 718 may be a column-oriented databases, row-oriented databases, or a combination thereof. In some embodiments, some or all of databases 718 are in-memory databases. That is, in some such embodiments, data for databases 718 are stored and managed in memory (e.g., random access memory (RAM)).

Client devices 702-708 are configured to execute and operate a client application (e.g., a web browser, a proprietary client application, etc.) that communicates with applications 714, services 716, and/or databases 718 via networks 710. This way, client devices 702-708 may access the various functionalities provided by applications 714, services 716, and databases 718 while applications 714, services 716, and databases 718 are operating (e.g., hosted) on cloud computing system 700. Client devices 702-708 may be computer system 500 or computing device 600, as described above by reference to FIGS. 5 and 6, respectively. Although system 700 is shown with four client devices, any number of client devices may be supported.

Networks 710 may be any type of network configured to facilitate data communications among client devices 702-708 and cloud computing system 712 using any of a variety of network protocols. Networks 710 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium 1 storing a program executable by at least one processing unit of a device, the program comprising sets of instructions for: receiving a set of audio files, each audio file in the set of audio files comprising audio from an audio call; truncating each audio file in the set of audio files to a defined call length; for each audio call in the set of audio calls, receiving a transcript of the audio call based on the truncated audio file of the audio call; and for each audio call in the set of audio calls, using the transcript of the audio call as input to a machine learning model for the machine learning model to predict a category from a plurality of categories that is associated with the audio call.

2. The non-transitory machine-readable medium of claim 1, wherein the program further comprises sets of instructions for:
for each audio file in the set of audio files, sending the audio file to a third-party transcription service; and
for each audio file in the set of audio files, receiving the transcript of the audio file from the third-party transcription service, wherein the third-party transcription service generates the transcript by converting the audio file to text using a speech-to-text algorithm.

3. The non-transitory machine-readable medium of claim 1, wherein the program further comprises sets of instructions for:
receiving a list of the set of audio calls from a third-party system configured to manage audio calls received at customer support centers;
sending the third-party system a request for metadata associated with the set of audio calls, the metadata comprising locations of the set of audio files of the audio calls; and
retrieving the set of audio files of the set of audio calls from the locations, wherein receiving the set of audio files comprises retrieving the set of audio files.

4. The non-transitory machine-readable medium of claim 3, wherein the program further comprises a set of instructions for storing the set of metadata associated with the set of audio calls and the categories associated with the set of audio calls in a storage.

5. The non-transitory machine-readable medium of claim 4, wherein the set of transcripts of the set of audio calls and the categories associated with the set of transcripts of the set of audio calls stored in the storage is used by a cloud computing system to generate visualizations for a client device.

6. The non-transitory machine-readable medium of claim 1, wherein each audio file in the set of audio files comprise a recording of a customer support session, wherein each category in the plurality of categories represents a closure classification for a particular customer support session.

7. The non-transitory machine-readable medium of claim 1, wherein the machine learning model is a transformer-based model.

8. A method comprising:
receiving a set of audio files, each audio file in the set of audio files comprising audio from an audio call;
truncating each audio file in the set of audio files to a defined call length;
for each audio call in the set of audio calls, receiving a transcript of the audio call based on the truncated audio file of the audio call; and
for each audio call in the set of audio calls, using the transcript of the audio call as input to a machine learning model for the machine learning model to predict a category from a plurality of categories that is associated with the audio call.

9. The method of claim 8 further comprising:
for each audio file in the set of audio files, sending the audio file to a third-party transcription service; and
for each audio file in the set of audio files, receiving from the transcript of the audio file from the third-party transcription service, wherein the third-party transcription service generates the transcript by converting the audio file to text using a speech-to-text algorithm.

10. The method of claim 8 further comprising:
receiving a list of the set of audio calls from a third-party system configured to manage audio calls received at customer support centers;
sending the third-party system a request for metadata associated 4 with the set of audio calls, the metadata comprising locations of the set of audio files of the audio calls; and
retrieving the set of audio files of the set of audio calls from the locations, wherein receiving the set of audio files comprises retrieving the set of audio files.

11. The method of claim 10 further comprising storing the set of metadata associated with the set of audio calls and the categories associated with the set of audio calls in a storage.

12. The method of claim 11, wherein the set of transcripts of the set of audio calls and the categories associated with the set of transcripts of the set of audio calls stored in the storage is used by a cloud computing system to generate visualizations for a client device.

13. The method of claim 8, wherein each audio file in the set of audio files comprise a recording of a customer support session, wherein each category in the plurality of categories represents a closure classification for a particular customer support session.

14. The method of claim 8, wherein the machine learning model is a transformer-based model.

15. A system comprising:
a set of processing units; and
a non-transitory machine-readable medium storing instructions that when executed by at least one processing unit in the set of processing units cause the at least one processing unit to:
receive a set of audio files, each audio file in the set of audio files comprising audio from an audio call;
truncate each audio file in the set of audio files to a defined call length;
for each audio call in the set of audio calls, receive a transcript of the audio call based on the truncated audio file of the audio call; and
for each audio call in the set of audio calls, use the transcript of the audio call as input to a machine learning model for the machine learning model to predict a category from a plurality of categories that is associated with the audio call.

16. The system of claim 15, wherein the instructions further 1 cause the at least one processing unit to:
for each audio file in the set of audio files, send the audio file to a third-party transcription service; and
for each audio file in the set of audio files, receive from the transcript of the audio file from the third-party transcription service, wherein the third-party transcription service generates the transcript by converting the audio file to text using a speech-to-text algorithm.

17. The system of claim 15, wherein the instructions further cause the at least one processing unit to:
- receive a list of the set of audio calls from a third-party system configured to manage audio calls received at customer support centers;
- send the third-party system a request for metadata associated with the set of audio calls, the metadata comprising locations of the set of audio files of the audio calls; and
- retrieve the set of audio files of the set of audio calls from the locations, wherein receiving the set of audio files comprises retrieving the set of audio files.

18. The system of claim 17, wherein the instructions further cause the at least one processing unit to store the set of metadata associated with the set of audio calls and the categories associated with the set of audio calls in a storage.

19. The system of claim 18, wherein the set of transcripts of the set of audio calls and the categories associated with the set of transcripts of the set of audio calls stored in the storage is used by a cloud computing system to generate visualizations for a client device.

20. The system of claim 15, wherein each audio file in the set of audio files comprise a recording of a customer support session, wherein each category in the plurality of categories represents a closure classification for a particular customer support session.

* * * * *